(12) United States Patent
Rudyan et al.

(10) Patent No.: US 10,870,982 B2
(45) Date of Patent: Dec. 22, 2020

(54) BELOW GRADE WATERPROOFING AND METHANE BARRIER SHEET MEMBRANE, WITH AN ALUMINUM PROTECTION LAYER AND A METHOD OF MAKING AND USING SAME

(71) Applicant: Amir Shy Rudyan, Canoga Park, CA (US)

(72) Inventors: Amir Shy Rudyan, Agoura Hills, CA (US); Paul Thomas Miller, Valencia, CA (US)

(73) Assignee: Amir Shy Rudyan, Canoga Park, CA (US)

( * ) Notice: Subject to any disclaimer, the term of this patent is extended or adjusted under 35 U.S.C. 154(b) by 0 days.

(21) Appl. No.: 16/671,035

(22) Filed: Oct. 31, 2019

(65) Prior Publication Data

US 2020/0141112 A1    May 7, 2020

Related U.S. Application Data (60) Provisional application No. 62/754,525, filed on Nov. 1, 2018.

(51) Int. Cl.

| | | |
|---|---|---|
| *E04B 1/62* | (2006.01) | |
| *B32B 11/08* | (2006.01) | |
| *B32B 15/20* | (2006.01) | |
| *E04B 1/94* | (2006.01) | |

(52) U.S. Cl.
CPC .............. *E04B 1/625* (2013.01); *B32B 11/08* (2013.01); *B32B 15/20* (2013.01); *E04B 1/946* (2013.01);

(Continued)

(58) Field of Classification Search
CPC ......... E04B 1/625; E04B 1/946; B32B 11/08; B32B 15/20; B32B 2419/00; B32B 2307/7265; B32B 2307/7242

(Continued)

(56) References Cited

U.S. PATENT DOCUMENTS

| | | | | |
|---|---|---|---|---|
| 1,418,349 A | * | 6/1922 | Young .................. | C09D 195/00 428/468 |
| 3,423,264 A | * | 1/1969 | Summerfelt ............ | B29C 70/10 156/71 |
| 6,122,887 A | * | 9/2000 | Massett ................... | E02D 31/02 52/169.11 |

(Continued)

FOREIGN PATENT DOCUMENTS

| | | | | |
|---|---|---|---|---|
| FR | 2666837 A1 | * | 3/1992 | ............ E04D 5/145 |
| KR | 20030041910 A | * | 5/2003 | |

(Continued)

*Primary Examiner* — Jeanette E Chapman
(74) *Attorney, Agent, or Firm* — Aziz M. Ahsan; Ahsan & Associates, PLLC (57) ABSTRACT

The invention is a below grade waterproofing and methane barrier sheet membrane with an aluminum facer and a method of making and using same, and more particularly the invention is directed to a dual layer system comprising of at least one bituminous moisture or waterproofing barrier sheet membrane with an aluminum facer or an aluminum layer that when combined is also a methane gas barrier, and is UV stable, that is used in construction of a building, and placed under, or around a foundation of a building or a dwelling or on its below grade retaining walls. Optionally, a liner and/or a drainage protection media can also be used with the inventive dual layer system.

20 Claims, 3 Drawing Sheets

(52) U.S. Cl.
CPC ............... *B32B 2307/7242* (2013.01); *B32B 2307/7265* (2013.01); *B32B 2419/00* (2013.01)

(58) Field of Classification Search
USPC ........................................... 52/741.3
See application file for complete search history.

(56) References Cited

U.S. PATENT DOCUMENTS

| | | | | |
|---|---|---|---|---|
| 6,279,275 | B1* | 8/2001 | Sawyer | E02D 31/06 405/43 |
| 9,074,335 | B2* | 7/2015 | Nicolas | E02D 19/00 |
| 9,416,515 | B2* | 8/2016 | Nicolas | E04B 1/70 |
| 2008/0120935 | A1* | 5/2008 | Lembo | E04B 1/625 52/408 |
| 2009/0056262 | A1* | 3/2009 | Kelly | E04D 13/1415 52/408 |
| 2009/0197042 | A1* | 8/2009 | Polk | E02D 31/02 428/137 |
| 2016/0024782 | A1* | 1/2016 | Bess | B32B 5/00 428/41.5 |
| 2016/0153161 | A1* | 6/2016 | Weinstein | B32B 5/06 405/129.6 |
| 2017/0198470 | A1* | 7/2017 | Hickie | B32B 27/306 |
| 2017/0356180 | A1* | 12/2017 | Lesire | B32B 7/14 |
| 2018/0001595 | A1* | 1/2018 | Seabaugh | B32B 1/00 |
| 2018/0245332 | A1* | 8/2018 | Widenbrant | B32B 5/18 |
| 2020/0240101 | A1* | 7/2020 | Rudyan | B32B 27/32 |

FOREIGN PATENT DOCUMENTS

| | | | | |
|---|---|---|---|---|
| KR | 2003073764 | A * | 9/2003 | |
| KR | 1850345 | B1 * | 1/2018 | |
| WO | WO 8912551 | A * | 12/1989 | |
| WO | WO-2004051019 | A1 * | 6/2004 | ............... B32B 7/12 |

\* cited by examiner

BELOW GRADE WATERPROOFING AND METHANE BARRIER SHEET MEMBRANE, WITH AN ALUMINUM PROTECTION LAYER AND A METHOD OF MAKING AND USING SAME

CROSS-REFERENCE TO RELATED APPLICATION

The instant patent application claims priority to and the benefit of U.S. Provisional Patent Application Ser. No. 62/754,525, filed on Nov. 1, 2018, titled "Below Grade Waterproofing And Methane Barrier Sheet Membrane, With An Aluminum Protection Layer And A Method Of Making And Using Same," the entire disclosure of which provisional application is incorporated herein by reference.

FIELD OF THE INVENTION

The invention is a below grade waterproofing and methane barrier sheet membrane with an aluminum facer and a method of making and using same, and more particularly the invention is directed to a dual layer system comprising of at least one bituminous moisture or waterproofing barrier sheet membrane with an aluminum facer or an aluminum layer that when combined is also a methane gas barrier, and is UV stable, that is used in construction of a building, and placed under, or around a foundation of a building or a dwelling or on its below grade retaining walls. Optionally, a liner and/or a drainage protection media can also be used with the inventive dual layer system.

BACKGROUND INFORMATION

Methane gas is a naturally occurring gas, and the accumulation of the methane gas can cause hazards, such as, for example, methane gas can cause explosion, or asphyxiation. Methane gas can be inhaled when it enters a home or an office building, and which can be fatal to an animal or a human. It can enter a home or an office building through cracks in the foundations of the building or through sewer traps if the house or office building is built on or near a landfill or in areas with naturally occurring methane in the soil. The chances of inhalation increase when people unknowingly pass by closed septic tanks, sewers, or farm waste pits. Along with sewers, the other areas where methane gas production may take place are rotting food in the kitchen, compost piles outside a window, potting soil in a plastic bag, exposure via waste water treatment plants, etc. Other sources that are known to produce methane gas is fracking, or other locations that may be unknowingly producing methane gas, and where humans can unknowingly inhale methane gas. Potentially explosive levels of methane gas can accumulate in a building from several sources, including explosive levels of sewer gas, swamp gas, or from a variety of possible sources including plumbing leaks, improper plumbing venting, or even swamp gas accumulation under a building.

Knowing the hazards of the methane gas to humans, various measures have been taken, such as, the most common requirement is to use a methane barrier under a structure or on its below grade retaining walls, which is due to the existence of methane in the soil (per the soil reports). Based on findings in the soil reports, it's determined, whether or not a methane barrier is required, or not required. It should be appreciated that concrete that is used in a foundation of a dwelling structure is porous, and so gases, such as, methane gas will go right through it, or seep through those pores. Thus, to prevent the formation of methane gas at home or in an office building, based per the soil report, it is necessary that the house, or the office building be provided with the instant inventive barrier layer or sheet, so that the methane gas that may be percolating up from the soil is channeled to escape from the edges of the inventive barrier and go into the atmosphere, and not go straight up into the dwelling through the foundation of the dwelling.

This invention improves on the deficiencies of the prior art and provides an inventive below grade waterproofing and methane barrier sheet membrane, with an aluminum protection layer and a method of making and using same.

PURPOSES AND SUMMARY OF THE INVENTION

The invention is a novel below grade waterproofing and methane barrier sheet membrane, with an aluminum protection layer and a method of making and using same.

Therefore, one purpose of this invention is to provide a novel below grade waterproofing and methane barrier sheet membrane, with an aluminum protection layer and a method of making and using same.

Another purpose of this invention is to provide a dual layer system that acts as a barrier, and prevents, and blocks water and moisture, from passing from one side of a structure to the other side.

Yet another purpose of this invention is to provide an innovative dual harrier layer system that can be used along a wall, a floor, a ceiling, or along any structure which requires water or moisture proofing.

Still yet another purpose of this invention is to provide at least one moisture or waterproof barrier layer along with a methane gas barrier layer for a structure made with concrete or shotcrete walls or floor.

Therefore, in one aspect this invention comprises a process of providing a dual waterproofing and methane harrier sheet system for a building, comprising the steps of:
(a) taking at least one non-metallic layer and securing it to at least one layer of aluminum sheet to form a dual waterproofing and methane barrier sheet having an exposed non-metallic face, and an exposed aluminum face;
(b) placing said dual waterproofing and methane barrier sheet over an unfinished building foundation, such that said non-metallic exposed face faces the earth, and said exposed aluminum face is exposed; and
(c) forming at least one layer of one of shotcrete and concrete layer over said exposed aluminum face to form a foundation for a structure, such that said foundation has an exterior surface in contact with and facing said exposed aluminum face, and an interior surface forming a floor for a building.

In another aspect this invention comprises a process of providing a dual waterproofing and methane barrier sheet system for a building, comprising the steps of:
(a) taking at least one non-metallic layer and securing it to at least one layer of aluminum sheet to form a dual waterproofing and methane barrier sheet having an exposed non-metallic face, and an exposed aluminum face, and wherein securing at least one release layer onto at least a portion of said exposed non-metallic face;
(b) securing said at least one release layer to an unfinished porous foundation wall; and
(c) applying one of concrete and shot-crete against said exposed aluminum face to form a wall.

In yet another aspect this invention comprises a process of providing a dual waterproofing and methane barrier sheet system for a building, comprising the steps of:

(a) forming a wall, using one of concrete and shot-crete, and wherein said wall has an interior surface, and an exterior surface;
(b) applying at least one primer to at least a portion of said exterior surface of said wall; and
(c) taking at least one non-metallic layer and securing it to at least one layer of aluminum sheet to form a dual waterproofing and methane barrier sheet having an exposed non-metallic face, and an exposed aluminum face, and securing at least a portion of said exposed non-metallic face to at least a portion of an exposed face of said at least one primer.

DETAILED DESCRIPTION

The inventive below grade waterproofing and methane barrier sheet membrane, with an aluminum protection layer, and a method of making, and using same, will now be discussed with reference to FIGS. 1 through 9. Although the scope of the present invention is much broader than any particular embodiment, a detailed description of the preferred embodiment follows together with drawings. These drawings are for illustration purposes only and are not drawn to scale. Like numbers represent like features and components in the drawings.

In summary the invention is a below grade waterproofing and methane barrier sheet membrane, with an aluminum protection layer, and a method of making, and using same, in building or wall or floor construction, and placing it under, and around, a foundation of a building, or a dwelling, or on its below grade blind side retaining walls, to name a few.

Figure 1:
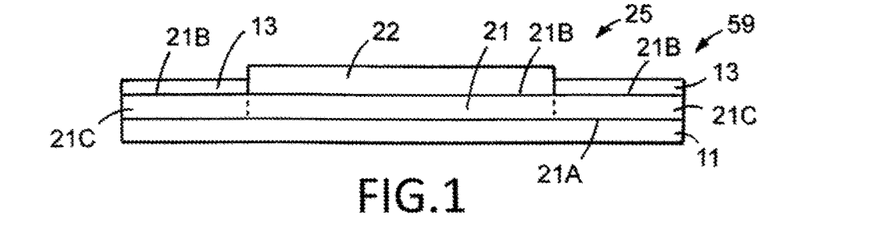
FIG. 1, illustrates a side view of the inventive dual below grade waterproofing and methane barrier sheet membrane with an aluminum protection layer.

FIG. 1, illustrates a side view of the inventive dual below grade waterproofing and methane barrier sheet membrane with an aluminum protection layer 25. The inventive dual membrane layer or sheet 25, comprises of at least one layer of at least one waterproofing material 21, such as, a non-metallic waterproofing material 21, such as, for example, a bitumen layer 21, which is secured to at least a portion of at least one layer of at least one metallic material 22, such as, for example, at least one layer of an aluminum layer or film or foil 22. It should be appreciated that the waterproofing material or bitumen layer 21, should be thick enough to act as a waterproofing or moisture proofing barrier or membrane, and is not a methane gas barrier. However, the aluminum film or layer 22, is both a waterproofing barrier, and is also a methane gas barrier, and thus the dual inventive layer system 25, provides both a waterproofing barrier layer, as well as it provides a methane gas barrier or layer, and this inventive combination is also UV stable. The bitumen layer 21, has a release film 11, on the entire bitumen surface 21A, the release film 11, can be a plastic release film 11, or a paper release film 11. It should be appreciated that the entire bitumen surface 21A, is very sticky or tacky, and will adhere to most any surface that it comes in contact with, and thus a release film or layer 11, is there to protect it during shipment and is removed just prior to its use when the bitumen surface 21A, is needed to be adhered to a surface, such as, for example, a wall 14, or an exterior surface 41. In addition, there is a small or mini-release film 13, on each selve edge 59, running the length of the roll or sheet on the aluminum side 21B, and covering the exposed portion or the edge portion 21C, such as, about 1 inch wide strip of the bitumen layer 21. However, there is no reason to have a release film on the exposed face or surface of the aluminum surface 22, of the dual inventive layer system 25, as it is not necessary. When installing the dual membrane 25, over an existing wall 14, (Post applied), one can typically use a primer 24, and which primer 24, can be solvent based, or water-based. Although the primer 24, may not always be required, but it is highly recommended to have a clean surface 41, of the wall 14. To install the inventive dual membrane 25, on a pre-existing wall 14, one can first apply the primer 24. Once the primer 24, has been cured, then one would remove the release film 11, from the bitumen side 21A, and adhere the bitumen layer side 21A, to the primed wall 14. If it's used as an under slab membrane/barrier 25, then one could simply roll out the membrane 25, onto the dirt 16, with the bitumen side 21A, facing the dirt or earth 16, but without removing the release liner 11, as that is not necessary. However, when applied as a pre-applied membrane 25, one would hang the inventive dual membrane 25, on the lagging 16, without removing the release liner 11. Factory laps, when used herein means bonding the bitumen edges 21C, running the length of both sides of the rolls or sheets of the dual inventive layer system 25. The edges 21C, running the length of the rolls or sheets of the dual inventive layer system 25, have selve edges 59, to make the bonding of the edges 21C, easier and better. These selve edges 59, are typically about 1 inches wide strip of bitumen 21, but without the aluminum facer portion 22, covering it. Factory laps in all installations are done by removing the small or mini-release film 13, on the selve edge 59, of a first sheet 25, and then bonding it to a second sheet 25, so as to bond the two sheets 25, together by bonding the bitumen side 21A, of the second sheet 25, to the about 1 inch wide strip of exposed bitumen 21C, on the first sheet 25. For some applications it is preferred that the first sheet 25, has an at least 2 inches overlap 26, at the seam with the second sheet 25, so as to ensure a 2 inch wide overlap 36, or a wide enough overlap 36, for the at least one securing means 27, 28, which will ensure a waterproofing barrier and a methane barrier, and also prevent the separation of the two sheets 25, of the dual inventive layer system 25. Non-factory laps as used herein means bonding the edges of the sheets 25, where there is no pre-existing factory lap 21C. Non-factory laps are done by installing a second sheet 25, over the first sheet 25, with say a minimum of about 2 inch overlap. One can do this by simply removing the release film 11, from the bituminous side 21A, of the second sheet 25, and exposing the bituminous surface 21A, and then laying it over the aluminum surface 22, of the first sheet 25, say about a minimum of about 2 inches, and then one would apply pressure with a roller (not shown) to ensure proper adhesion between the two layers 21, 22. In post applied walls 14, the entire release film 11, on the bitumen side 21A, is removed, since the entire sheet 21, using the bitumen surface 21A, will be bonded or secured to the exterior surface 41, of the existing wall 14, using the adhesive capabilities of the bitumen layer 21. In under-slab, and blind side application, the release film 11, is only removed, say about 2 inches, from the edge 59, which is just enough to provide a proper overlap between the two sheets 25, and leaving the remaining release film 11, in place.

Figure 2:
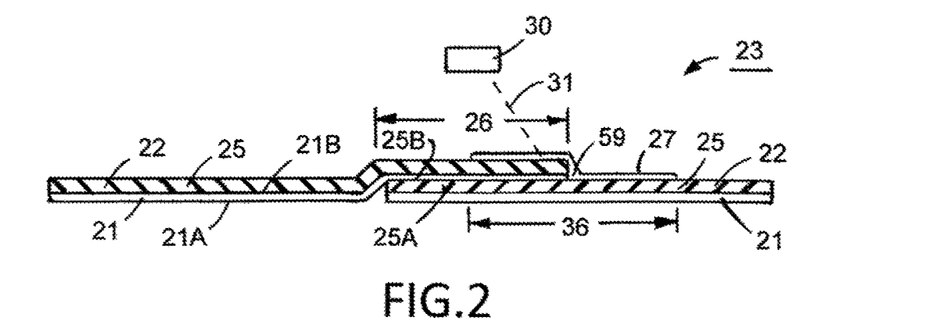
FIG. 2, illustrates a side view of the below grade inventive waterproofing and methane barrier sheet membrane with an aluminum protection layer according to a first embodiment of the invention.

FIG. 2, illustrates a side view of the below grade inventive waterproofing and methane barrier sheet membrane with an aluminum protection layer 25, according to a first embodiment of the invention 23. The inventive dual protection layer 25, comprises of at least one layer of at least one waterproofing sheet membrane 21, which is secured to at least one layer of an aluminum protection layer or facer or sheet 22, and thus this combination of the two layers 21, 22, provide the inventive dual waterproofing and methane barrier sheet membrane with an aluminum protection layer 25. The at least one inventive sheet or membrane 25, is used preferably in a below grade application. For some applications the at least one layer of at least one waterproofing and methane barrier sheet membrane 21, comprises of at least one layer of bituminous waterproofing barrier sheet membrane 21. The inventive dual protection layer 25, has at least one, release film 11, to protect the exposed surface of the at least one layer of at least one waterproofing barrier sheet membrane 21, during transportation, and wherein the release film 11, is removed when the inventive dual protection layer 25, is used in situ. For areas where one inventive sheet 25, is joined to another inventive sheet 25, such as, at a seam, it is preferred that at least a portion of the area that is going to be overlapped 26, has a wipe clean surfaces 25A, 25B, especially the surfaces that are going to be mated. For some applications, one could use a light solvent (not shown) to clean the overlapping surfaces 25A, 258, of the inventive dual protection layer 25, that needs to be joined. Before bonding the next layer of the inventive sheet 25, to an existing layer or already placed inventive sheet 25, one should remove the release film 11, from the factory laps (the selvedge areas) 59, of the existing sheet 25, and the release film 11, from the bituminous layer of the next sheet. For a blind side or an under-slab application, only a small portion of say approximately about 2 inches wide strip of the release film 11, can be removed from the bituminous side 21A, of the next layer to be installed so it could properly bond to the existing layer 21. It is preferred that the next or second inventive sheet or barrier layer 25, be installed and mated with the previous or already installed inventive sheet 25, and has, for example, a minimum of say about 2.0 inches of overlap 26, of edge portions 25A, 25B. For some applications it is preferred that a steel or rubber roller, is rolled or passed over the overlap 26, or the joint area 26, several times while applying pressure to ensure proper adhesion between the first inventive sheet 25, and the second inventive sheet 25, that are being joined at their respective edge portions 25A, 25B. For some applications, which are very rare, such as, for example, during cold weather where one inventive layer 25, for some reason is not adhering to the second inventive layer 25, one could optionally and gently use a heat gun 30, with radiation 31, which will help improve the adhesion between the two overlapping inventive layers 25, at the edge portions 25A, 25B. In order to provide an opening free seam or joint 26, it is preferred that the edge 59, or the selvedge 59, is covered with at least one securing means 27, 28, such as, for example, an approved aluminum tape 27, (when used in any type of post applied methane application), or an approved sealant 28, such as, for example, an AVM Aussie Seal M 28, (for all non-factory overlaps 26, below the water table 48, or moisture table 48, when used as a waterproofing membrane only). For an overlap or joint 26 or an edge 59, or a selvedge area 59, that does not have well-defined edge or selvedge areas 59, one would then just remove the release film 11, from the bitumen side 21A, of the second inventive sheet 25, that is being joined at the two edge portions 25A, 25B, so as to provide a larger sheet for a larger continuous coverage or to provide a "continuous" inventive sheet 25. Whether it is a seam or overlap 26, an edge 59, a selvedge 59, it is preferred that when applicable, the aluminum tape 27, or the sealant 28, is applied in such a manner that it completely covers the joint area or edge 59, and that the aluminum tape 27, or the sealant 28, is along an overlap area 36, so as to completely seal or cover or protect the edge 59, or selvedge 59. It should be appreciated that not all seam areas 26, will require an aluminum tape 27, or a sealant 28, over them, as this will be used only when applicable.

Figure 3:
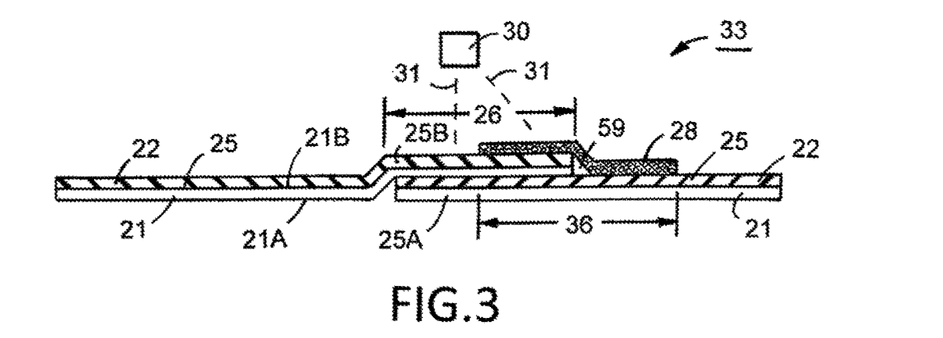
FIG. 3, illustrates a side view of the below grade inventive waterproofing and methane barrier sheet membrane with an aluminum protection layer according to a second embodiment of the invention.

FIG. 3, illustrates a side view of the below grade inventive waterproofing and methane barrier sheet membrane with an aluminum protection layer 25, according to a second embodiment of the invention 33. The inventive dual protection layer 25, comprises of at least one layer of at least one waterproofing barrier sheet membrane 21, which is secured to at least one layer of an aluminum protection layer or facer or sheet 22, and thus this combination of the two layers 21, 22, provide the inventive dual waterproofing and methane barrier sheet membrane with an aluminum protection layer 25. The at least one inventive sheet or membrane 25, is used preferably in a below grade application. For some applications the at least one layer of at least one waterproofing barrier sheet membrane 21, comprises of at least one layer of bituminous waterproofing barrier sheet membrane 21. The inventive dual protection layer 25, has at least one, release film 11, to protect the exposed surface of the at least one layer of at least one waterproofing barrier sheet membrane 21, during transportation, and wherein the release film 11, is removed when the inventive dual protection layer 25, is used in situ. For areas where one inventive sheet 25, is joined to another inventive sheet 25, such as, at a seam area 26, it is preferred that at least a portion of the area that is going to be overlapped 26, has a wipe clean surfaces 25A, 25B, especially the surfaces that are going to be mated. For some applications, one could use a light solvent (not shown) to clean the overlapping surfaces 25A, 25B, of the inventive dual protection layer 25, that needs to be joined. Before bonding the next layer of the inventive sheet 25, to an existing layer or already placed inventive sheet 25, one should remove the release film 11, from the factory laps (the selvedge areas) 59, of the existing sheet 25, and the release film 11, from the bituminous layer of the next sheet. For a blind side or an under-slab application, only a small portion of say approximately about 2 inches wide strip of the release film 11, can be removed from the bituminous side 21A, of the next layer to be installed so it could properly bond to the existing layer 21. It is preferred that the next or second inventive sheet or barrier layer 25, be installed and mated with the previous or already installed inventive sheet 25, and has, for example, a minimum of say about 2.0 inches of overlap 26, of edge portions 25A, 25B. For some applications it is preferred that a steel or rubber roller, is rolled or passed over the overlap 26, or the joint area 26, several times while applying pressure to ensure proper adhesion between the first inventive sheet 25, and the second inventive sheet 25, that are being joined at their respective edge portions 25A, 25B. For some applications, which are very rare, such as, for example, during cold weather where one inventive layer 25, for some reason is not adhering to the second inventive layer 25, one could optionally and gently use a heat gun 30, with radiation 31, which will help improve the adhesion between the two overlapping inventive layers 25, at the edge portions 25A, 25B. In order to provide an opening free seam or joint 26, it is preferred that the edge 59, or the selvedge 59, is covered with at least one securing means 27, 28, such as, for example, an approved aluminum tape 27, (when used in any type of post applied methane application), or an approved sealant 28, such as, for example, an AVM Aussie Seal M 28, (for all non-factory seam areas 26, below the water table 48, or moisture table 48, when used as a waterproofing membrane only). For a seam or joint 26, or an edge 59, or a selvedge area 59, that does not have well-defined edge or selvedge areas 59, one would then just remove the release film 11, from the bitumen side 21A, of the second inventive sheet 25, that is being joined at the two edge portions 25A, 25B, so as to provide a larger sheet for a larger continuous coverage or to provide a "continuous" inventive sheet 25. Whether it is a seam area 26, an edge 59, a selvedge 59, it is preferred that when applicable, the aluminum tape 27, or the sealant 28, is applied in such a manner that it completely covers the joint area 59, and that the aluminum tape 27, or the sealant 28, is along an overlap area 36, so as to completely seal or cover or protect the edge 59, or selvedge 59. It should be appreciated that not all seam areas 26, will require an aluminum tape 27, or a sealant 28, over them, as this will be used only when applicable.

Figure 4:
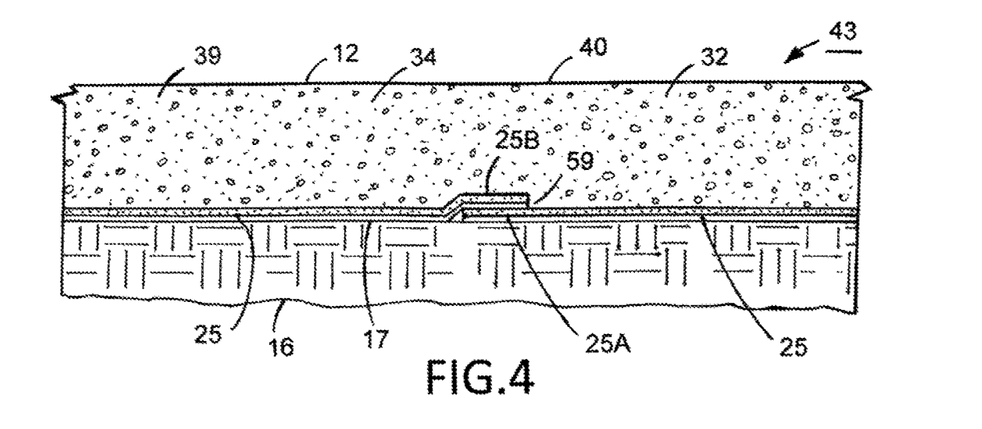
FIG. 4, illustrates a side view of the inventive below grade waterproofing and methane barrier sheet membrane with an aluminum protection layer according to a third embodiment of the invention.

FIG. 4, illustrates a side view of the inventive below grade waterproofing and methane barrier sheet membrane with an aluminum protection layer 25, according to a third embodiment of the invention 43. FIG. 4, illustrates the application of the invention for a foundation or below-grade construction. After the earth 16, has been dug up and is ready for the laying of the foundation of a building or structure 34, the earth 16, is first compacted, so that the exposed surface of the earth 16, is substantially planar, or one could provide a substantially planar mud slab 16. The next step is to place the dual inventive layer system 25, on top of the earth 16, or mud slab 16. However, for some applications one could optionally have at least one layer of a liner 17, such as, for example, a 10 mil high-density polyethylene (HDPE) liner 17, or a polyethylene high-density (PEHD) liner 17, which is a polyethylene thermoplastic made from petroleum, liner 17, which liner 17, would be placed over the exposed surface of the earth 16, or the mud slab 16. For applications where a liner 17, is used, the dual inventive layer 25, would then be placed over the exposed surface of the liner 17. For some applications one could also optionally use at least one appropriate drainage/protection 17, such as, for example, one could use an optional drain board 17, such as, for example, an AVM Drain Board 6000 17, or another approved protection media 17, such as, for example, at least one foam layer 17, or at least one polystyrene insulation board 17, the exterior or exposed surface or face of the inventive dual barrier layer 25. The next step would be to pour concrete 39, or shotcrete 39, over the exposed surface of the inventive dual barrier layer 25, for the foundation of the building 34, so as to form a floor 12, having an exposed surface 40. As shown in FIG. 4, at least one layer of the inventive sheet or barrier layer 25, is under the slab 39, such as, a concrete slab 39, and above dirt 16, or compacted Earth 16, or a mud slab 16. The at least one layer of the inventive sheet or barrier layer 25, can be at least one layer of a bituminous sheet waterproofing membrane or layer 21, which has secured to at least one layer of aluminum layer or sheet 22. Thus, the inventive layer 25, provides both a methane gas barrier and a waterproof barrier layer. The inventive sheet or membrane 25, is a "methane approved" heavy duty bituminous waterproofing and methane sheet membrane for below-grade waterproofing and methane barrier applications. The inventive sheet or layer 25, is UV stable, and can be preferably, say about 60-mils thick membrane 21, with at least one layer of an aluminum protection layer 22. It is preferred that the inventive sheet 25, that are joined or mated at the seam area 26, or edge 59, have an overlap 26, such as, for example, a minimum of say, about 2.0 inches, along a joint or a seam area 26, or edge 59, or a selvedge area 59. And, similarly, it is preferred that the aluminum tape 27, or the sealant 28, that is applied along the seam area 26, or edge 59, is done in such a manner that it completely covers the joint area 59, and that the aluminum tape 27, or the sealant 28, is along an overlap area 36, so as to completely seal or cover or protect the edge 59, or selvedge 59.

Figure 5:
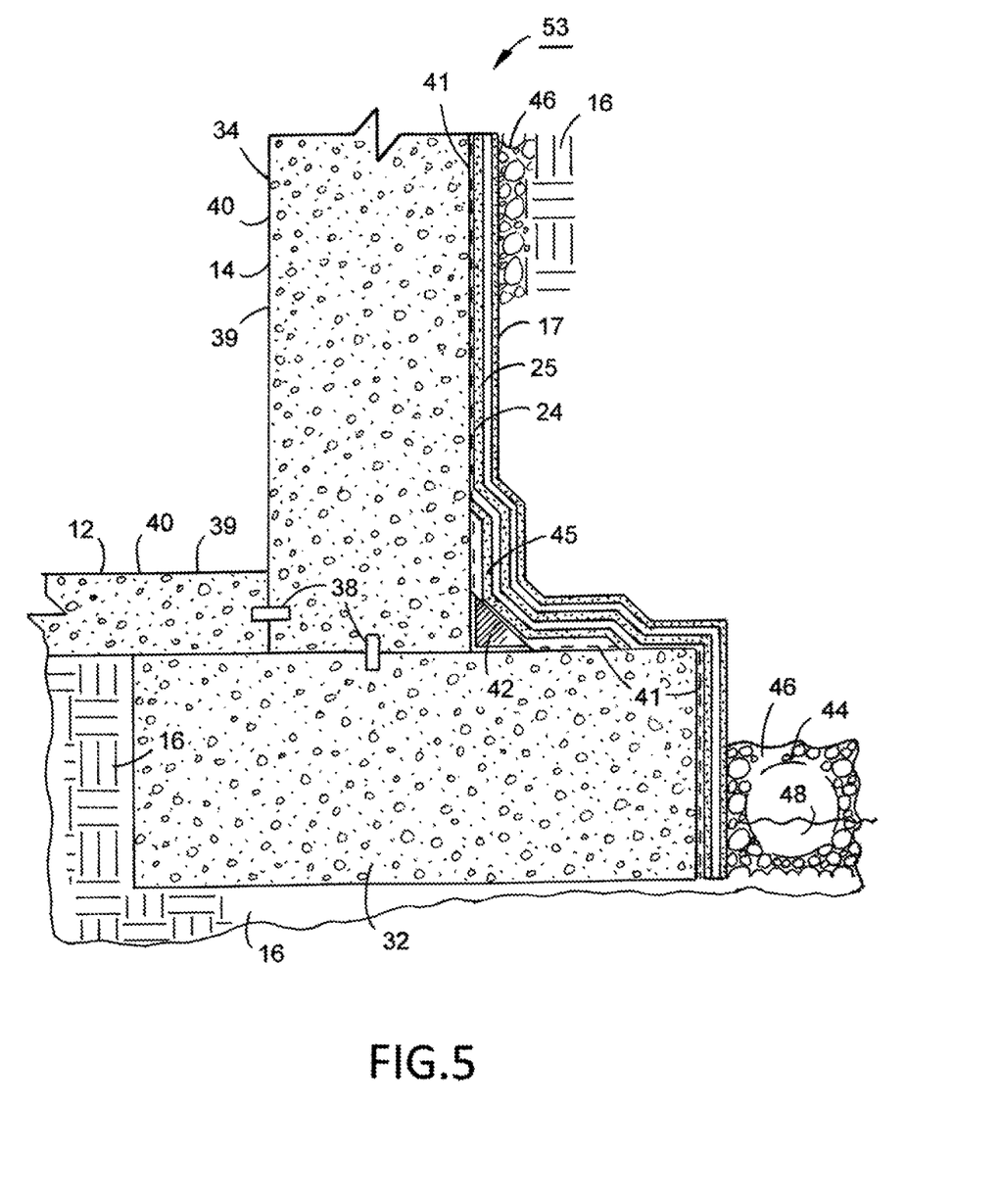
FIG. 5, illustrates a side view of the inventive below grade waterproofing and methane barrier sheet membrane with an aluminum protection layer according to a fourth embodiment of the invention.

FIG. 5, illustrates a side view of the inventive below grade waterproofing and methane barrier sheet membrane with an aluminum protection layer 25, according to a fourth embodiment of the invention 53. After the structure 34, has been built using concrete 39, or shotcrete 39, the concrete floor 12, has an exposed surface 40, and the concrete wall 14, has an interior exposed surface 40, and an exterior exposed surface 41. The formed structure 34, can have one or more waterstop 38, such as, for example, an Aussie Swell waterstop 38. The next step, if needed, would be to form a cant strip 42, such as, a mortar or sealant cant strip 42, along the exterior exposed surface 41, especially, along the corner where the floor foundation meets the wall 14. For some applications, one could also then apply at least one layer of strip 45, such as, for example, AVM Aussie Mate strip 45, over the mortar or sealant cant strip 42, and along the corner of the exterior exposed surface 41, where the floor foundation meets the wall 14. For some applications one could also apply at least one layer of an adhesive 24, or primer 24, such as, AVM Adhesive 501, AVM Primer 500, AVM Aussie Membrane 500, to name a few, along the exterior exposed surface 41, especially, along the exposed exterior surface 41, of the foundation 32, and/or along the exposed exterior surface 41, of the wall 14. The next step would be place the inventive dual layer system 25, along the exposed exterior surface 41, such as, along the exposed surface 41, of the foundation 32, and/or along the exposed surface 41, of the wall 14. For some applications one could also optionally use at least one appropriate drainage/protection 17, such as, for example, one could use an optional drain board 17, such as, for example, an AVM Drain Board 6000 17, or another approved protection media 17, such as, for example, at least one foam layer 17, or at least one polystyrene insulation board 17, over the exterior or exposed surface or face of the inventive dual barrier layer 25. The next step would be to fill the area with earth 16. However, for some applications one could fill the area along the exposed surface 41, after the placement of the inventive dual sheet 25, or the drain board 17, with a layer of backfill 46, such as, for example, gravel backfill 46, prior to the filling of the area with earth 16. Please note that for some applications a backfill 46, may not be required if a drainage board 17, is used. A drainage pipe 44, such as, a perforated drainage pipe 44, is usually, placed adjacent the exposed surface 41, of the foundation 32, so as to catch and channel any water 48, or moisture 48, that may be around the foundation 32, or along the exterior of the wall 14. Typically, a layer of gravel 46, is used to surround the drainage pipe 44. FIG. 5, further shows the retaining wall 14, which has at least one layer of the inventive dual barrier layer 25, on grade at the top of footing 32, comprising of at least one inventive layer of bituminous sheet waterproofing layer or membrane 21, and the at least one aluminum layer or facer 22. The inventive dual sheet or membrane 25, is a "methane approved" heavy duty bituminous waterproofing sheet membranes 21, with the at least one layer of aluminum 22, for below-grade waterproofing applications. The inventive sheet or layer 25, is an UV (Ultraviolet) stable, preferably, say about 60-mil thick, membrane, with at least one layer of an aluminum protection layer 22. It is preferred that one only use an approved liquid adhesives or primers 24, such as, for example, AVM Adhesive 501, AVM Primer 500, AVM Aussie Membrane 500, to name a few. It is preferred that all inventive sheets or membranes 25, that are joined to have an overlap 26, a minimum of say, 2.0 inches, along a joint or a seam area 26, or a selvedge area 59. It is also preferred that when used as a post applied methane barrier one should cover all factory laps or non-factory laps with an approved aluminum tape 27. When the inventive sheet or layer 25 is used only as a waterproofing membrane in the water table, (when no methane gas protection is required) all non-factory laps (laps without the selvedge) should be sealed with an approved sealant 28, such as, for example, an AVM Aussie Seal M, 28. And, similarly, it is preferred that the aluminum tape 27, or the sealant 28, that is applied along the seam area 26, or edge 59, is done in such a manner that it completely covers the joint area 59, and that the aluminum tape 27, or the sealant 28, is along an overlap area 36, so as to completely seal or cover or protect the edge 59, or selvedge 59.

Figure 6:
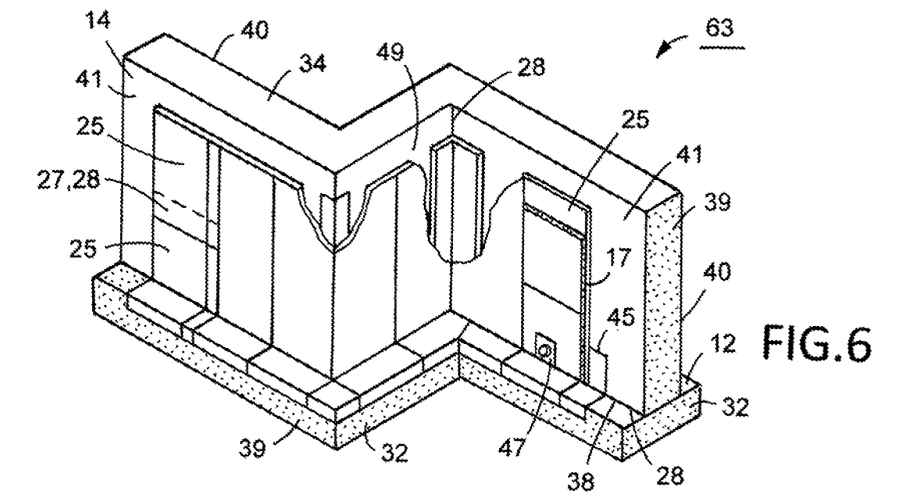
FIG. 6, illustrates a side perspective view of the inventive below grade waterproofing and methane barrier sheet membrane with an aluminum protection layer according to a fifth embodiment of the invention.

FIG. 6, illustrates a side perspective view of the inventive below grade waterproofing and methane barrier sheet membrane with an aluminum protection layer 25, according to a fifth embodiment of the invention 63. FIG. 6, illustrates a retaining wall 14, having the inventive dual layer system 25, comprising of at least one layer of bituminous sheet waterproofing barrier sheet 21, and integrated with at least one aluminum layer or sheet 22, The inventive dual sheet or membrane 25, is a "methane approved" heavy duty bituminous waterproofing and methane barrier sheet membrane for below-grade waterproofing and methane barrier applications. The inventive sheet 25, is a UV (Ultraviolet) stable, preferably, say about 60-mils membrane 21, with at least one aluminum protection layer or facer 22. For some applications one could also optionally use at least one appropriate drainage/protection 17, such as, for example, one could use an optional drain board 17, such as, for example, an AVM Drain Board 6000 17, or another approved protection media 17, such as, for example, at least one foam layer 17, or at least one polystyrene insulation board 17, over the exterior or exposed surface or face of the inventive dual barrier layer 25. It is preferred that only an approved liquid adhesive 24, or a primer 24, be used, such as, for example, AVM Adhesive 501, AVM Primer 500, AVM Aussie Membrane 500, to name a few. It is preferred that all inventive sheet or barrier layers 25, that are joined at the edge 59, or seam area 26, have an overlap 26, of a minimum of say, about 2.0 inches, along a joint or a seam 26, or edge 59, or a selvedge area 59. It is also preferred that when used as a post applied methane barrier 25, one should cover all factory laps or non-factory laps with an approved aluminum tape 27. When the inventive sheet or layer 25, is used only as a waterproofing membrane 25, in the water table 48, or moisture table 48, (when no methane protection is required) all non-factory laps (laps without the selvedge 59) should be sealed with an approved sealant 28, such as, for example, an AVM Aussie Seal M, 28. And, similarly, it is preferred that the aluminum tape 27, or the sealant 28, that is applied along the seam 26, or edge 59, is done in such a manner that it completely covers the joint area 59, and that the aluminum tape 27, or the sealant 28, is along an overlap area 36, so as to completely seal or cover or protect the edge 59, or selvedge 59. For some applications one can have an optional termination bar 49.

There are several ways to use this invention, the most common ones are, for example, (a) Under a slab 32, (b) On a wall 14, in a blind side application or pre-applied, (c) On a wall 14, in a post applied application where the wall 14, is pre-existing, and combinations thereof, to name a few.

Figure 7:
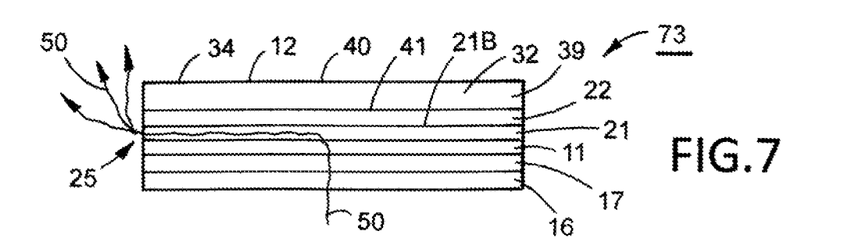
FIG. 7, illustrates a side view of the inventive below grade waterproofing and methane barrier sheet membrane with an aluminum protection layer according to a sixth embodiment of the invention.

FIG. 7, illustrates a side view of the inventive below grade waterproofing and methane barrier sheet membrane with an aluminum protection layer 25, according to a sixth embodiment of the invention 73. FIG. 7, is an example of under a slab 32, application of this invention. As one can see that the inventive dual layer system 25, having the release layer 11, is placed over the earth 16, mud slab 16, lagging 16, and then concrete 39, or shot-crete 39, is poured over the inventive dual layer system 25, such that the aluminum surface or face 22, faces the exterior surface 41, or face 41, of the poured concrete 39, and that the release liner 11, can stay on the inventive dual layer system 25, and faces the dirt 16, or mud slab 16. As stated earlier the optional drainage media 17, can also be placed on top of the dirt floor 16, or the mud slab 16, or lagging 16, prior to the placement of the inventive dual layer system 25. As one can appreciate that the methane gas 50, that percolates from the earth 16, will rise towards the foundation 32, but the aluminum layer 22, will stop the passage or passing through of the methane gas 50, and thus the methane gas 50, will travel along the surface 21B, and exit at the end of the structure 34, into the atmosphere.

Figure 8:
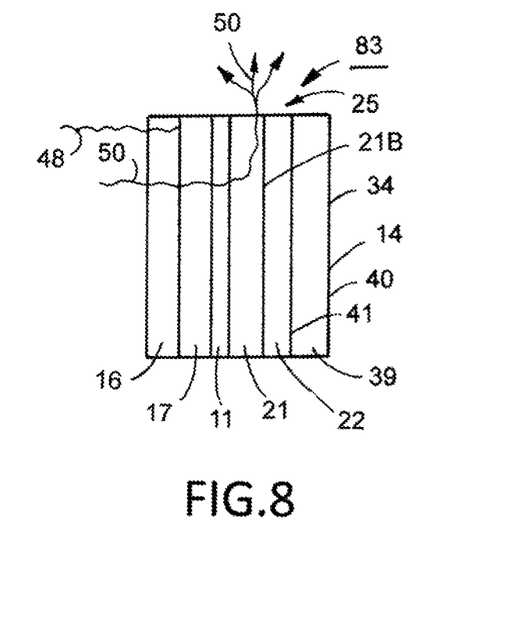
FIG. 8, illustrates a side view of the inventive below grade waterproofing and methane barrier sheet membrane with an aluminum protection layer according to a seventh embodiment of the invention.

FIG. 8, illustrates a side view of the inventive below grade waterproofing and methane barrier sheet membrane with an aluminum protection layer 25, according to a seventh embodiment of the invention 83. FIG. 8, is an example of the use of the inventive dual layer system 25, on the wall 14, in a blind side application or pre-applied. As one can see that the inventive dual layer system 25, having the release layer 11, is placed or hung onto along the earth 16, or dirt wall 16, or mud slab 16, or lagging 16, and then concrete 39, or shot-crete 39, is poured against the inventive dual layer system 25, such that the aluminum surface or face 22, faces the exterior surface 41, or face 41, of the poured concrete 39, or shot-crate 39, and that the release liner 11, can stay on the inventive dual layer system 25, and faces the dirt 16, or mud slab 16, or lagging 16. As stated earlier the optional drainage media 17, can also be placed against the dirt 16, or the mud slab 16, or lagging 16, prior to the placement of the inventive dual layer system 25. As one can appreciate that the methane gas 50, that percolates from the earth 16, will move towards the wall 14, but the aluminum layer 22, will stop the passage or passing through of the methane gas 50, and thus the methane gas 50, will travel along the surface 21B, and exit at the end of the structure 34, into the atmosphere. Similarly, the water 48, or moisture 48, would move towards the wall 14, but the bitumen layer 21, or the optional drainage media 17, would prevent or stop the passage or passing through of the water 48, or moisture 48, into the structure 34.

Figure 9:
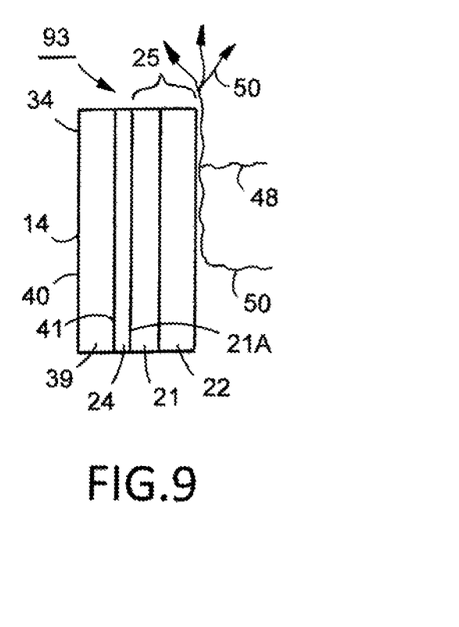
FIG. 9, illustrates a side view of the inventive below grade waterproofing and methane barrier sheet membrane with an aluminum protection layer according to an eighth embodiment of the invention.

FIG. 9, illustrates a side view of the inventive below grade waterproofing and methane barrier sheet membrane with an aluminum protection layer 25, according to an eighth embodiment of the invention 93. FIG. 9, is an example of the use of the inventive dual layer system 25, on the wall 14, in a post applied application where the wall 14, is pre-existing, and the inventive dual layer system 25, is adhered to the exterior surface 41, or face 41, of the existing wall 14. It is recommended that the exterior surface 41, of the existing wall 14, is first cleaned and prepped, before the securing of the inventive dual layer system 25, on to the wall 14. For some applications, one could also apply at least one layer of a primer 24, or an adhesive 24, such as, for example, AVM Adhesive 501, AVM Primer 500, AVM Aussie Membrane 500, to name a few, along the exterior exposed surface 41, of the wall 14. The release liner or layer 11, is then removed, and the exposed side 21A, of the non-metallic layer 21, or the waterproofing or moisture proofing barrier layer 21, or the bitumen layer 21, is bonded or adhered or hung onto the exterior surface 41, of the wall 14, while the metallic layer 22, or the aluminum layer 22, faces outwardly, or away from the exterior surface 41, of the wall 14. As one can appreciate that the methane gas 50, that percolates from the earth 16, will move towards the wall 14, but the aluminum layer 22, will stop the passage or passing through of the methane gas 50, and thus the methane gas 50, will travel along the exterior surface of the aluminum layer 22, and stay away from the structure 34. Similarly, the water 48, or moisture 48, that could move towards the wall 14, would be stopped by the aluminum layer 22, and the water 48, or moisture 48, would be prevented or stopped from entering into the structure 34.

It is highly recommended that one visually inspect all surfaces after installation of the inventive sheet or barrier layer 25, to ensure full and proper adhesion, especially at corners, seams, drains, footings and other hard-to-reach areas. Similarly, for the protection of installed work of the inventive sheet or barrier 25, one should preferably protect the inventive waterproofing and methane barrier layer 25, from possible damage, such as, by using at least one layer of a drainage board 17, or at least one protective panel layer 17, over the already installed inventive sheet or barrier 25.

The inventive sheet or barrier 25, is a UV (Ultraviolet) stable, at least one about 55-60-mil heavy duty bituminous waterproofing barrier sheet membrane 21, with at least one aluminum protection layer or sheet 22. The inventive sheet 25, has exhibited excellent adhesion, elongation and recovery properties. Unlike other sheet membranes, the inventive sheet 25, can be exposed to UV (Ultraviolet) up to, for example, about 180 days. This inventive material or layer 25, can be used for a retaining walls 14, as a waterproofing and/or methane barrier on below-grade, concrete, block walls, basements, etc., or under slabs, as a waterproofing/vapor barrier and/or methane barrier under, say concrete slabs.

For concrete/block walls 14, it is preferred that all surfaces 41, to which the inventive sheet or barrier layer 25, is going to be applied to must be sound and stable, with an even finish and free from dust, loose debris, grease, curing agents, etc. if necessary, one could apply a parge coat or a thin slurry coat, such as, using an AVM Crete 6200 parge coating. A parge coat is a thin coat of a cementitious or polymeric mortar applied to concrete or masonry for refinement of the surface 41. Parging (or pargeting) is usually applied with a trowel and pressed into the existing surface 41. The intent is to create a contiguous surface 41, by filling surface air voids and bug-holes (eliminating bug-hole-induced outgassing), to level a surface 41, with extreme rugosity, or to prep a surface 41, for top-coating with a high-performance protective coating.

It should be appreciated that the inventive dual layer system 25, may be applied to a damp location, but not to a waterlogged surfaces, such as, green concrete (the American Concrete Institute (ACI) defines green concrete as concrete that has set but not appreciably hardened), however, one could use an adhesive, such as, an Adhesive 501, a primer, such as, a Primer 500, or a membrane, such as, an Aussie Membrane 500, for a damp location to adhere the inventive layer 25, to the damp location. For under slab over compacted earth or mud slab, it is preferred that all surfaces to which the inventive layer 25, that may be installed or applied must be sound and stable, with an even finish and free from sharp edges, loose debris, oil, grease, etc. For the security of the inventive layer 25, one should protect adjacent surfaces which could be damaged during the application procedure, and could adversely affect or impact the inventive layer's stability during use. Due to the nature of the invention the inventive layer or barrier sheet 25, should not be used or applied to cover expansion joints, as they tend to move considerably during their life cycle.

The inventive dual layer system 25, has a water vapor permeance that meets or exceeds the ASTM E 96 water method. The inventive sheet 25, is resistance to decay, and meets or exceeds the ASTM 154/ASTM E 96 water method. The inventive sheet meets or exceeds the tension and elongation (MD) % elongation, such as, ASTM D 2523, and the tension and elongation (CMD) % elongation, such as, ASTM D 2521 The inventive sheet 25, has an adhesion to concrete or masonry (lbf/in.) that meets or exceeds the ASTM D 903 standard. The inventive sheet 25, is puncture resistance (lbf) and meets or exceeds the ASTM E 154 standard. The inventive sheet 25, meets or exceeds the hydrostatic pressure resistance (ft of water) of ASTM 751 standard. The inventive sheet 25, meets or exceeds the low temperature flexibility (MD) ASTM D 5147, and low temperature flexibility (CMD) ASTM D 5147.

It should be appreciated that selvage or selvedge 59, as related to the inventive dual membrane layer or sheet 25, or AVM Aussie Mate 580-AL 25, consists of two narrow strips 21C, (approximately about 1 inches wide on each side) of exposed bitumen 21, on the aluminum side 22, of the sheet 25, running along the length of the rolls or sheets of the inventive dual layer system 25. These strips 21C, of the exposed bitumen 21, are covered with a narrow strip of release film 13, which is to be removed to expose the strip of bitumen 21C, just before applying the bituminous side 21A, of the next sheet 25, over it, thus when bonding a lap using the selvedge 59, the bond is "bitumen to bitumen". Thus, the exposed strip 21C, of the selvedge bitumen 21C, bonds to the bituminous side or surface 21A, of the next sheet 25.

The at least one layer of the waterproofing barrier sheet membrane layer 21, such as, for example, at least one layer of bituminous waterproofing barrier sheet membrane 21, preferably has a thickness from say between about 20 mils, to about 250 mils, and preferably about 56 mils.

The at least one layer of the aluminum sheet or facer or layer 22, preferably has a thickness from say between about 1 mils, to about 6 mils, and preferably about 4 mils thick.

It should be appreciated that for some applications where the inventive dual membrane system 25, is being installed as a methane barrier under slab 32, the methane engineer or the city could require a layer of sand over the inventive dual membrane system 25, as an additional protection layer.

The present invention is not limited to the embodiments described herein and the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions.

It should be further understood that throughout the specification and claims several terms have been used and they take the meanings explicitly associated herein, unless the context clearly dictates otherwise. For example, the phrase "in one embodiment" as used herein does not necessarily refer to the same embodiment, though it may. Additionally, the phrase "in another embodiment" as used herein does not necessarily refer to a different embodiment, although it may. Thus, various embodiments of the invention may be readily combined, without departing from the scope or spirit of the invention.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A process of providing a dual waterproofing and methane barrier sheet system for a building, comprising the steps of:
    (a) taking at least one non-metallic layer and securing it to at least one layer of aluminum sheet to form a dual waterproofing and methane barrier sheet having an exposed non-metallic face, and an exposed aluminum face;
    (b) placing said dual waterproofing and methane barrier sheet over an unfinished structure, such that said non-metallic exposed face faces said unfinished structure, and said exposed aluminum face is exposed; and
    (c) forming at least one layer of one of shotcrete and concrete layer over said exposed aluminum face to form a foundation for a building structure, such that said foundation has an exterior surface in contact with and facing said exposed aluminum face, and an interior surface.

2. The process of providing a dual waterproofing and methane barrier sheet system of claim 1, wherein said at least one non-metallic layer is a bituminous layer.

3. The process of providing a dual waterproofing and methane barrier sheet system of claim 1, wherein at least one layer of at least one liner is placed between earth, and said dual waterproofing and methane barrier sheet.

4. The process of providing a dual waterproofing and methane barrier sheet system of claim 1, wherein at least one layer of at least one liner is placed between earth, and said dual waterproofing and methane barrier sheet, and wherein said at least one liner is selected from a group consisting of a high-density polyethylene (HDPE) liner, a polyethylene high-density (PEHD) liner, a polyethylene thermoplastic made from petroleum liner, and combinations thereof.

5. The process of providing a dual waterproofing and methane barrier sheet system of claim 1, wherein at least one layer of at least one drainage protection media is placed between earth, and said dual waterproofing and methane barrier sheet.

6. The process of providing a dual waterproofing and methane barrier sheet system of claim 1, wherein at least one layer of at least one drainage protection media is placed between earth, and said dual waterproofing and methane barrier sheet, and wherein said at least one drainage protection media is selected from a group consisting of a drain board, a foam layer, a polystyrene insulation board, and combinations thereof.

7. The process of providing a dual waterproofing and methane barrier sheet system of claim 1, wherein said dual waterproofing and methane barrier sheet has a seam, and wherein at least one seam joint is secured to said seam so as to provide a continuous sheet of said dual waterproofing and methane barrier sheet.

8. The process of providing a dual waterproofing and methane barrier sheet system of claim 1, wherein said dual waterproofing and methane barrier sheet has a seam, and wherein at least one seam joint is secured to said seam so as to provide a continuous sheet of said dual waterproofing and methane barrier sheet, and wherein said at least one seam joint is selected from a group consisting of an aluminum tape, an adhesive, a sealant, and combinations thereof.

9. The process of providing a dual waterproofing and methane barrier sheet system of claim 1, wherein said unfinished structure is selected from a group consisting of a wall, a foundation, a blind wall, an exterior wall, a foundation slab, and combinations thereof.

10. The process of providing a dual waterproofing and methane barrier sheet system of claim 1, wherein a first edge of said at least one dual waterproofing and methane barrier sheet is attached to a second edge of at least one second dual waterproofing and methane barrier sheet via an overlap.

11. The process of providing a dual waterproofing and methane barrier sheet system of claim 1, wherein a first edge of said at least one dual waterproofing and methane barrier sheet is attached to a second edge of at least one second dual waterproofing and methane barrier sheet via an overlap, and wherein at least one securing means is placed over and along said overlap to completely cover said overlap.

12. The process of providing a dual waterproofing and methane barrier sheet system of claim 1, wherein a first edge of said at least one dual waterproofing and methane barrier sheet is attached to a second edge of at least one second dual waterproofing and methane harder sheet via an overlap, and wherein at least one securing means is placed over and along said overlap to completely cover said overlap, and wherein said at least one securing means is selected from a group consisting of an aluminum tape, an adhesive, a sealant, and combinations thereof.

13. The process of providing a dual waterproofing and methane barrier sheet system of claim 1, wherein a first edge of said at least one dual waterproofing and methane harrier sheet is attached to a second edge of at least one second dual waterproofing and methane barrier sheet via an overlap, and wherein at least one securing means is placed over and along said overlap to completely cover said overlap, and wherein at least one heat gun is used to securely affix said at least one securing means to said first edge of said at least one dual waterproofing and methane barrier sheet, and said second edge of said at least one second dual waterproofing and methane barrier sheet.

14. The process of providing a dual waterproofing and methane barrier sheet system of claim 1, wherein the thickness of said at least one non-metallic layer is between about 20 mils to about 250 mils, and preferably about 56 mils.

15. The process of providing a dual waterproofing and methane barrier sheet system of claim 1, wherein the thickness of said at least one layer of aluminum sheet is between about 1 mils to about 6 mils, and preferably about 4 mils.

16. The process of providing a dual waterproofing and methane barrier sheet system of claim 1, wherein at least one release sheet is secured over said exposed surface of said at least one non-metallic layer.

17. The process of providing a dual waterproofing and methane barrier sheet system of claim 1, wherein at least one release sheet is secured over said exposed surface of said at least one non-metallic layer, and wherein said at least one release sheet is selected from a group consisting of plastic sheet, paper sheet, and combinations thereof.

18. A process of providing a dual waterproofing and methane barrier sheet system for a building, comprising the steps of:
   (a) taking at least one non-metallic layer and securing it to at least one layer of aluminum sheet to form a dual waterproofing and methane harrier sheet having an exposed non-metallic face, and an exposed aluminum face, and wherein securing at least one release layer onto at least a portion of said exposed non-metallic face;
   (b) securing said at least one release layer to an unfinished porous structure; and
   (c) applying one of concrete and shot-crete against said exposed aluminum face.

19. The process of providing a dual waterproofing and methane barrier sheet system of claim 18, wherein at least one drainage media is securely placed between said unfinished porous structure and said at least one release layer.

20. A process of providing a dual waterproofing and methane barrier sheet system for a building, comprising the steps of:
   (a) forming a wall, using one of concrete and shot-crete, and wherein said wall has an interior surface, and an exterior surface;
   (b) applying at least one primer to at least a portion of said exterior surface of said wall; and
   (c) taking at least one non-metallic layer and securing it to at least one layer of aluminum sheet to form a dual waterproofing and methane harrier sheet having an exposed non-metallic face, and an exposed aluminum face, and securing at least a portion of said exposed non-metallic face to at least a portion of an exposed face of said at least one primer.

\* \* \* \* \*

UNITED STATES PATENT AND TRADEMARK OFFICE
CERTIFICATE OF CORRECTION

PATENT NO. : 10,870,982 B2  
APPLICATION NO. : 16/671035  
DATED : December 22, 2020  
INVENTOR(S) : Amir Shy Rudyan et al.

Page 1 of 1

It is certified that error appears in the above-identified patent and that said Letters Patent is hereby corrected as shown below:

In the Claims

In Column 15, Claim 12, Line 5, please delete "harder", and insert therefor -- barrier --.

In Column 15, Claim 13, Line 3, please delete "harrier", and insert therefor -- barrier --.

In Column 16, Claim 18, Line 6, please delete "harrier", and insert therefor -- barrier --.

In Column 16, Claim 20, Line 11, please delete "harrier", and insert therefor -- barrier --.

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*